(12) United States Patent
Mishra (10) Patent No.: US 9,079,199 B2
(45) Date of Patent: Jul. 14, 2015

(54) SYSTEM FOR INCREASING THE LIFE OF FUEL INJECTORS

(75) Inventor: Niraj Kumar Mishra, Bangalore (IN)

(73) Assignee: General Electric Company, Schenectady, NY (US)

( * ) Notice: Subject to any disclaimer, the term of this patent is extended or adjusted under 35 U.S.C. 154(b) by 816 days.

(21) Appl. No.: 12/815,238

(22) Filed: Jun. 14, 2010

(65) Prior Publication Data

US 2011/0303758 A1 Dec. 15, 2011

(51) Int. Cl.

| | |
|---|---|
| B05B 15/00 | (2006.01) |
| B05B 7/04 | (2006.01) |
| B05B 7/16 | (2006.01) |
| C01B 3/34 | (2006.01) |
| C01B 3/48 | (2006.01) |
| C01B 13/02 | (2006.01) |
| F23D 11/10 | (2006.01) |
| F23D 11/40 | (2006.01) |
| F23D 14/48 | (2006.01) |
| F23D 14/64 | (2006.01) |
| F23D 14/78 | (2006.01) |
| C10J 3/50 | (2006.01) |
| F01K 23/06 | (2006.01) |

(52) U.S. Cl.
CPC .............. *B05B 7/0433* (2013.01); *B05B 7/0475* (2013.01); *B05B 7/0483* (2013.01); *B05B 7/1606* (2013.01); *C01B 3/34* (2013.01); *C01B 3/48* (2013.01); *C01B 13/0229* (2013.01); *C10J 3/506* (2013.01); *F01K 23/068* (2013.01); *F23D 11/102* (2013.01); *F23D 11/40* (2013.01); *F23D 14/48* (2013.01); *F23D 14/64* (2013.01); *F23D 14/78* (2013.01); *C01B 2203/0233* (2013.01); *C01B 2203/0283* (2013.01); *C01B 2203/0415* (2013.01); *C01B 2203/86* (2013.01); *C10J 2200/152* (2013.01); *C10J 2300/0943* (2013.01); *C10J 2300/0959* (2013.01); *C10J 2300/165* (2013.01); *C10J 2300/169* (2013.01); *C10J 2300/1612* (2013.01); *C10J 2300/1653* (2013.01); *C10J 2300/1675* (2013.01); *C10J 2300/1815* (2013.01); *Y02E 20/16* (2013.01); *Y02E 20/18* (2013.01); *Y02E 20/185* (2013.01)

(58) Field of Classification Search
CPC ....... C01B 3/363; F23D 14/78; F02M 53/043
USPC ................................ 239/132–132.5, 422–424
See application file for complete search history.

(56) References Cited

U.S. PATENT DOCUMENTS

| | | |
|---|---|---|
| 3,874,592 A | 4/1975 | Buschmann et al. |
| 4,836,831 A | 6/1989 | Martens |
| 4,858,538 A | 8/1989 | Kuypers et al. |

(Continued)

FOREIGN PATENT DOCUMENTS

| | | |
|---|---|---|
| CN | 1101113 | 4/1995 |
| CN | 1311712 | 9/2001 |

(Continued)

*Primary Examiner* — Len Tran
*Assistant Examiner* — Joel Zhou
(74) *Attorney, Agent, or Firm* — Fletcher Yoder P.C.

(57) ABSTRACT

According to various embodiments, a system includes a gasification fuel injector. The gasification fuel injector includes a fuel conduit configured to inject the fuel, the first oxygen conduit configured to inject oxygen, a second oxygen conduit configured to inject oxygen, and a cooling gas conduit configured to flow a cooling gas. The cooling gas is flame resistant.

25 Claims, 3 Drawing Sheets

(56) References Cited

U.S. PATENT DOCUMENTS

| | | |
|---|---|---|
| 4,878,835 A | 11/1989 | Martens |
| 4,888,031 A | 12/1989 | Martens |
| 4,952,218 A * | 8/1990 | Lipp et al. .................... 48/86 R |
| 5,261,602 A * | 11/1993 | Brent et al. ................ 239/132.3 |
| 5,931,978 A | 8/1999 | Oortwijn et al. |
| 6,276,611 B1 | 8/2001 | Brooker et al. |
| 6,389,815 B1 * | 5/2002 | Hura et al. .................... 60/746 |
| 6,755,355 B2 | 6/2004 | Whittaker |
| 6,892,654 B2 | 5/2005 | Whittaker et al. |
| 2010/0101229 A1 * | 4/2010 | York et al. .................... 60/737 |
| 2011/0056206 A1 * | 3/2011 | Wiebe .............................. 60/740 |

FOREIGN PATENT DOCUMENTS

| | | |
|---|---|---|
| CN | 101063052 | 10/2007 |
| EP | 400740 | 12/1990 |
| WO | WO9833870 | 8/1998 |

\* cited by examiner

SYSTEM FOR INCREASING THE LIFE OF FUEL INJECTORS

BACKGROUND OF THE INVENTION

The subject matter disclosed herein relates to fuel injectors, and, more particularly, to fuel injectors for gasifiers.

A variety of combustion systems employ fuel injectors to inject a fuel into a combustion chamber. For example, an integrated gasification combined cycle (IGCC) power plant includes a gasifier with one or more fuel injectors. The fuel injectors supply a fuel, such as an organic feedstock, into the gasifier along with oxygen and steam to generate a syngas. In general, combustion occurs downstream from the fuel injectors. However, the proximity of a flame and/or heat from combustion can damage and/or reduce the life of the fuel injectors, particularly if the fuel injectors exceed certain temperatures. Accordingly, a water cooling coil may be wrapped around each fuel injector to provide water cooling. Unfortunately, the water cooling coil can cause significant thermal gradients in the fuel injector, thereby increasing the possibility of stress crack formation in the fuel injector.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gasification fuel injector. The gasification fuel injector includes a fuel conduit configured to inject the fuel, a first oxygen conduit configured to inject oxygen, a second oxygen conduit configured to inject oxygen, and a cooling gas conduit configured to flow a cooling gas. The cooling gas is flame resistant.

In a second embodiment, a system includes a fuel injector. The fuel injector includes a fuel conduit configured to inject a fuel, a first oxygen conduit configured to inject oxygen, and a carbonaceous gas conduit configured to inject a carbonaceous gas between the fuel injector and a combustion region downstream from the fuel injector.

In a third embodiment, a system includes a combustion chamber and a fuel injector coupled to the combustion chamber. The fuel injector includes a fuel conduit configured to inject a fuel, a first oxygen conduit configured to inject oxygen, and a plurality of effusion cooling holes configured to cool the fuel injector.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

A gasification fuel injector in a gasifier of an IGCC power plant is an example of a fuel injector that may be used in combustion. Because combustion occurs near a tip of the fuel injector, the tip may be exposed to temperatures up to approximately 1,300 degrees Celsius (C). In addition, hot combustion gases may recirculate back toward the fuel injector. Such high temperatures may cause damage to the fuel injector even though the injector is made from materials specifically designed for high temperatures. Accordingly, different cooling methods may be used to increase the life of fuel injectors. For example, fuel injector tips may have an integral cooling liquid conduit through which a cooling liquid passes. In addition, a cooling coil may surround the body of the fuel injector to carry cooling liquid to the cooling liquid conduit. However, when such methods are used without any other cooling techniques, an external surface of the fuel injector may be exposed to hot recirculated gases, while an internal surface of the fuel injector is in contact with the cooling liquid. For example, the temperature of the cooling liquid may be approximately 40 degrees C., resulting in a temperature difference of approximately 1,260 degrees C. Such a large temperature gradient may result in cracks near the tip of the fuel injector. Specifically, the high temperatures and temperature fluctuations may cause radial cracks near the tip. In addition, high strain forces caused by the high temperature gradient may cause circumferential cracks. Such cracks may reduce the life of the fuel injector.

To address these issues, in various embodiments described below, a cooling gas conduit configured to flow a cooling gas (e.g., a flame resistant cooling gas) may be added to the fuel injector to provide additional cooling. The cooling gas conduit may be configured to be the outermost conduit of the fuel injector, and thus, help to move the high temperatures of the gasifier away from the tip of the fuel injector. In addition, the cooling gas conduit may include one or more lateral holes to eject the cooling gas at various locations along the surface of the fuel injector. The cooling gas may provide a flame resistant gas barrier along the surface and/or between the fuel injector and the combustion. Thus, the cooling gas both cools the fuel injector and blocks the flame from holding on the surface of the fuel injector. The resulting cooling will reduce the temperature gradient across the fuel injector. In certain embodiments, the cooling gas conduit may be combined with cooling liquid conduits and/or cooling coils.

Figure 1:
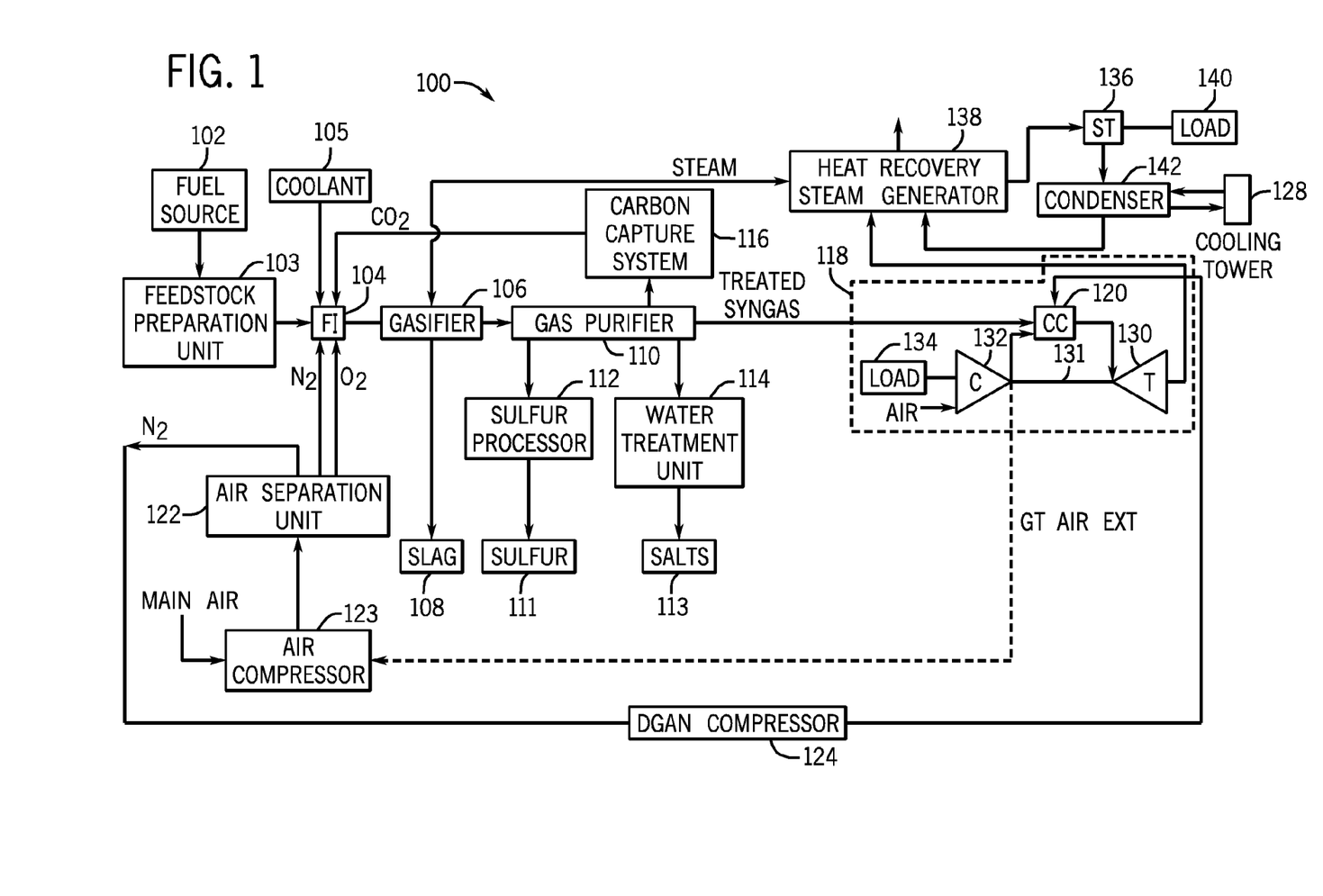
FIG. 1 is a block diagram of an IGCC power plant incorporating a fuel injector according to an embodiment.

Turning now to the drawings, FIG. 1 is a diagram of an embodiment of an IGCC system 100 that may produce and burn a synthetic gas, i.e., syngas. As discussed in detail below, the IGCC system 100 may include an embodiment of a gasification fuel injector that includes a cooling gas conduit configured to flow a suitable flame resistant cooling gas, such as carbon dioxide ($CO_2$), nitrogen, argon, helium, inert gases, noble gases, or any combination thereof. Other elements of the IGCC system 100 may include a fuel source 102, which may be a solid or a liquid, that may be utilized as a source of energy for the IGCC system. The fuel source 102 may include coal, petroleum coke, oil, biomass, wood-based materials, agricultural wastes, tars, coke oven gas and asphalt, or other carbon containing items.

The fuel of the fuel source 102 may be passed to a feedstock preparation unit 103. The feedstock preparation unit 103 may, for example, resize or reshape the fuel source 102 by chopping, milling, shredding, pulverizing, briquetting, or palletizing the fuel source 102 to generate feedstock. Additionally, water, or other suitable liquids may be added to the fuel source 102 in the feedstock preparation unit 103 to create slurry feedstock. In other embodiments, no liquid is added to the fuel source, thus yielding dry feedstock. In further embodiments, the feedstock preparation unit 103 may be omitted if the fuel source 102 is a liquid.

Next, the feedstock may be passed to a fuel injector 104 coupled to a gasifier 106. As appreciated, the gasifier 106 is one example of a combustion chamber that may use the fuel injector 104 with the cooling gas conduit as discussed in detail below. In certain embodiments, the fuel injector 104 combines the various feed streams to the gasifier 106 in such a manner as to promote efficient combustion. In addition, a coolant 105, described in more detail below, may be directed to the fuel injector 104 to provide cooling and extend the life of the fuel injector. Specifically, the gasifier 106 may convert the feedstock into a syngas, e.g., a combination of carbon monoxide and hydrogen. This conversion may be accomplished by subjecting the feedstock to a controlled amount of steam and oxygen at elevated pressures, e.g., from approximately 20 bar to 85 bar, and temperatures, e.g., approximately 700 degrees C. to 1600 degrees C., depending on the type of gasifier 106 utilized. The gasification process may include the feedstock undergoing a pyrolysis process, whereby the feedstock is heated. Temperatures inside the gasifier 106 may range from approximately 150 degrees C. to 700 degrees C. during the pyrolysis process, depending on the fuel source 102 utilized to generate the feedstock. The heating of the feedstock during the pyrolysis process may generate a solid (e.g., char) and residue gases (e.g., carbon monoxide, hydrogen, and nitrogen). The char remaining from the feedstock from the pyrolysis process may only weigh up to approximately 30% of the weight of the original feedstock.

A combustion process may then occur in the gasifier 106. The combustion may include introducing oxygen to the char and residue gases. The char and residue gases may react with the oxygen to form carbon dioxide and carbon monoxide, which provides heat for the subsequent gasification reactions. The temperatures during the combustion process may range from approximately 700 degrees C. to 1600 degrees C. Next, steam may be introduced into the gasifier 106 during a gasification step. The char may react with the carbon dioxide and steam to produce carbon monoxide and hydrogen at temperatures ranging from approximately 800 degrees C. to 1100 degrees C. In essence, the gasifier utilizes steam and oxygen to allow some of the feedstock to be "burned" to produce carbon monoxide and release energy, which drives a second reaction that converts further feedstock to hydrogen and additional carbon dioxide.

In this way, the gasifier 106 manufactures a resultant gas. This resultant gas may include approximately 85% of carbon monoxide and hydrogen in equal proportions, as well as $CH_4$, HCl, HF, COS, $NH_3$, HCN, and $H_2S$ (based on the sulfur content of the feedstock). This resultant gas may be termed untreated syngas, because it includes, for example, $H_2S$. The gasifier 106 may also generate waste, such as slag 108, which may be a wet ash material. This slag 108 may be removed from the gasifier 106 and disposed of, for example, as road base or as another building material. To clean the untreated syngas, a gas purifier 110 may be utilized. In one embodiment, the gas purifier 110 may be a water gas shift reactor. The gas purifier 110 may scrub the untreated syngas to remove the HCl, HF, COS, HCN, and $H_2S$ from the untreated syngas, which may include separation of sulfur 111 in a sulfur processor 112 by, for example, an acid gas removal process in the sulfur processor 112. Furthermore, the gas purifier 110 may separate salts 113 from the untreated syngas via a water treatment unit 114 that may utilize water purification techniques to generate usable salts 113 from the untreated syngas. Subsequently, the gas from the gas purifier 110 may include treated syngas (e.g., the sulfur 111 has been removed from the syngas), with trace amounts of other chemicals, e.g., $NH_3$ (ammonia) and $CH_4$ (methane).

In some embodiments, a gas processor may be utilized to remove additional residual gas components, such as ammonia and methane, as well as methanol or any residual chemicals from the treated syngas. However, removal of residual gas components from the treated syngas is optional, because the treated syngas may be utilized as a fuel even when it includes the residual gas components, e.g., tail gas. At this point, the treated syngas may include approximately 3% CO, approximately 55% $H_2$, and approximately 40% $CO_2$ and is substantially stripped of $H_2S$.

In some embodiments, a carbon capture system 116 may remove and process the carbonaceous gas (e.g., carbon dioxide that is approximately 80-100 or 90-100 percent pure by volume) included in the syngas. The carbon capture system 116 also may include a compressor, a purifier, a pipeline that supplies $CO_2$ for sequestration or enhanced oil recovery, a $CO_2$ storage tank, or any combination thereof. The captured carbon dioxide may be transferred to a carbon dioxide expander, which decreases the temperature of the carbon dioxide (e.g., approximately 5-100 degrees C., or about 20-30 degrees C.), thus enabling the carbon dioxide to be used as a suitable cooling agent for the system. For example, the cooled carbon dioxide may be transferred as cooling gas to the cooling gas conduit of the fuel injector 104. The cooled carbon dioxide may also be circulated through the system to meet its refrigeration needs or expanded through subsequent stages for even lower temperatures. During startup, cooled carbon dioxide may not be immediately available for the fuel injector 104. In such situations, stored carbon dioxide may be used as a cooling gas for the fuel injector 104. For example, either carbon dioxide produced during operation or obtained from off-site may be transferred to storage tanks. In addition, other flame resistant gases, such as, but not limited to, steam or nitrogen, may be used instead of carbon dioxide as a coolant for the fuel injector 104. For example, both steam and nitrogen may be available from elsewhere in the IGCC system 100, and thus may be suitable candidates for cooling the fuel injector 104. Returning to the treated syngas, which has undergone the removal of its sulfur containing components and a large fraction of its carbon dioxide, the syngas may be then transmitted to a combustor 120, e.g., a combustion chamber, of a gas turbine engine 118 as combustible fuel.

The IGCC system 100 may further include an air separation unit (ASU) 122. The ASU 122 may operate to separate air into component gases by, for example, distillation techniques. The ASU 122 may separate oxygen from the air supplied to it from a supplemental air compressor 123, and the ASU 122 may transfer the separated oxygen to the fuel injector 104. Additionally the ASU 122 may transmit separated nitrogen to the fuel injector 104 (e.g., as cooling gas) or a diluent nitrogen (DGAN) compressor 124.

The DGAN compressor 124 may compress the nitrogen received from the ASU 122 at least to pressure levels equal to those in the combustor 120, so as not to interfere with the proper combustion of the syngas. Thus, once the DGAN compressor 124 has adequately compressed the nitrogen to a proper level, the DGAN compressor 124 may transmit the compressed nitrogen to the combustor 120 of the gas turbine engine 118. The nitrogen may be used as a diluent to facilitate control of emissions, for example.

As described previously, the compressed nitrogen may be transmitted from the DGAN compressor 124 to the combustor 120 of the gas turbine engine 118. The gas turbine engine 118 may include a turbine 130, a drive shaft 131, and a compressor 132, as well as the combustor 120. The combustor 120 may receive fuel, such as syngas, which may be injected under pressure from fuel nozzles. This fuel may be mixed with compressed air as well as compressed nitrogen from the DGAN compressor 124, and combusted within combustor 120. This combustion may create hot pressurized exhaust gases.

The combustor 120 may direct the exhaust gases towards an exhaust outlet of the turbine 130. As the exhaust gases from the combustor 120 pass through the turbine 130, the exhaust gases force turbine blades in the turbine 130 to rotate the drive shaft 131 along an axis of the gas turbine engine 118. As illustrated, the drive shaft 131 is connected to various components of the gas turbine engine 118, including the compressor 132.

The drive shaft 131 may connect the turbine 130 to the compressor 132 to form a rotor. The compressor 132 may include blades coupled to the drive shaft 131. Thus, rotation of turbine blades in the turbine 130 may cause the drive shaft 131 connecting the turbine 130 to the compressor 132 to rotate blades within the compressor 132. This rotation of blades in the compressor 132 causes the compressor 132 to compress air received via an air intake in the compressor 132. The compressed air may then be fed to the combustor 120 and mixed with fuel and compressed nitrogen to allow for higher efficiency combustion. The drive shaft 131 may also be connected to load 134, which may be a stationary load, such as an electrical generator for producing electrical power, for example, in a power plant. Indeed, load 134 may be any suitable device that is powered by the rotational output of the gas turbine engine 118.

The IGCC system 100 also may include a steam turbine engine 136 and a heat recovery steam generation (HRSG) system 138. The steam turbine engine 136 may drive a second load 140. The second load 140 may also be an electrical generator for generating electrical power. However, both the first 130 and second 140 loads may be other types of loads capable of being driven by the gas turbine engine 118 and steam turbine engine 136. In addition, although the gas turbine engine 118 and steam turbine engine 136 may drive separate loads 134 and 140, as shown in the illustrated embodiment, the gas turbine engine 118 and steam turbine engine 136 may also be utilized in tandem to drive a single load via a single shaft. The specific configuration of the steam turbine engine 136, as well as the gas turbine engine 118, may be implementation-specific and may include any combination of sections.

The system 100 may also include the HRSG 138. Heated exhaust gas from the gas turbine engine 118 may be transported into the HRSG 138 and used to heat water and produce steam used to power the steam turbine engine 136. Exhaust from, for example, a low-pressure section of the steam turbine engine 136 may be directed into a condenser 142. The condenser 142 may utilize a cooling tower 128 to exchange heated water for chilled water. The cooling tower 128 acts to provide cool water to the condenser 142 to aid in condensing the steam transmitted to the condenser 142 from the steam turbine engine 136. Condensate from the condenser 142 may, in turn, be directed into the HRSG 138. Again, exhaust from the gas turbine engine 118 may also be directed into the HRSG 138 to heat the water from the condenser 142 and produce steam.

In combined cycle systems, such as the IGCC system 100, hot exhaust may flow from the gas turbine engine 118 and pass to the HRSG 138, where it may be used to generate high-pressure, high-temperature steam. The steam produced by the HRSG 138 may then be passed through the steam turbine engine 136 for power generation. In addition, the produced steam may also be supplied to any other processes where steam may be used, such as to the gasifier 106. The gas turbine engine 118 generation cycle is often referred to as the "topping cycle," whereas the steam turbine engine 136 generation cycle is often referred to as the "bottoming cycle." By combining these two cycles as illustrated in FIG. 1, the IGCC system 100 may lead to greater efficiencies in both cycles. In particular, exhaust heat from the topping cycle may be captured and used to generate steam for use in the bottoming cycle.

Figure 2:
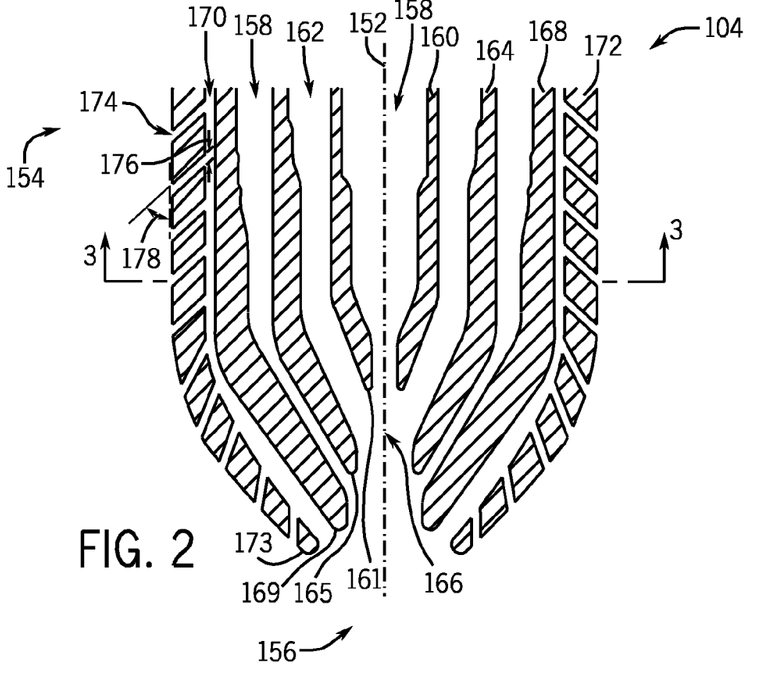
FIG. 2 is an axial cross-section of an embodiment of a fuel injector with a cooling gas conduit.

With the forgoing in mind, FIG. 2 is an axial cross-section of the fuel injector 104 in accordance with an embodiment. An axial axis 152 passes through the center of the fuel injector 104. The fuel injector 104 has an upstream side 154, from which the feedstock, oxygen, and other materials may originate. The fuel injector 104 also has a tip 156, where the feedstock, oxygen, and other materials may exit. Thus, the tip 156 is an outlet for the materials. Turning next to the conduits of the fuel injector 104, although one arrangement of conduits will be described, other arrangements are possible depending on the requirements of a particular application. Specifically, the innermost material passing through the fuel injector 104 is oxygen 158, which is directed to the tip 156 by a first oxygen conduit 160, which terminates in a first oxygen outlet 161. The first oxygen conduit 160 supplies oxygen 158 for combustion downstream of the tip 156 of the fuel injector 104. Oxygen 158 may include, but is not limited to, pure oxygen, oxygen mixtures, and air. The next outermost material is a fuel 162, which is directed to the tip 156 by a fuel conduit 164, which terminates in a fuel outlet 165. Thus, the fuel conduit 164 surrounds the first oxygen conduit 160 in a coaxial or concentric arrangement. The fuel 162 may include a dry fuel, a slurry fuel, a liquid fuel, or any combination thereof. The fuel conduit 164 directs the fuel 162 just downstream of oxygen 158 from the first oxygen conduit 160 to enhance the mixing of the fuel and oxygen. The region where the oxygen 158 from the first oxygen conduit 160 and the fuel 162 combine may be referred to as a pre-mix zone 166. The next outermost material is oxygen 158, which is directed to the tip 156 of the fuel injector 104 by a second oxygen conduit 168, which terminates in a second oxygen outlet 169. Thus, the second oxygen conduit 168 surrounds the fuel conduit 164 in a coaxial or concentric arrangement. The second oxygen conduit 168 may direct oxygen 158 to the mixture of the fuel 162 and oxygen from the first oxygen conduit 160 to produce a fine spray for efficient combustion. The oxygen 158 from the second oxygen conduit 168 may also include, but is not limited to, pure oxygen, oxygen mixtures, and air.

Surrounding the first oxygen conduit 160, the fuel conduit 164, and the second oxygen conduit 168 is a cooling gas conduit 172, which directs cooling gas 170 near the tip 156 of the fuel injector 104. The cooling gas conduit 172 terminates in a cooling gas outlet 173, which surrounds the first oxygen outlet 161, the fuel outlet 165, and the second oxygen outlet 169. In certain embodiments, the cooling gas conduit 172 may extend along the entire length or some fraction of the entire length of the fuel injector 104 up to the tip 156. In operation, the cooling gas 170 is injected between the fuel injector 104 and a combustion region downstream from the fuel injector. Thus, the cooling gas 170 forms a film (or thermal barrier) between the mixture of fuel 162 and oxygen 158 from the fuel injector 104 and any flame or hot combustion gases in the gasifier 106. In other words, the film of cooling gas 170 is non-combustible and/or flame resistant, and thus blocks flames from holding on a surface of the fuel injector 104. The film of cooling gas 170 also protects the tip 156 of the fuel injector 104 from damage by reducing the exposure of the tip to the high temperatures of the combustion gases. The location of the cooling gas conduit 172 at the tip 156 is determined by at least two considerations. First, if the cooling gas conduit 172 is located too far downstream from the second oxygen conduit 168, flame instability may occur, which may reduce combustion efficiency. Second, if the cooling gas conduit 172 is located too far upstream from the second oxygen conduit 168, the tip of the second oxygen conduit may be exposed to high temperatures. Thus, if the cooling gas conduit 172 is positioned properly, the film of cooling gas 170 may help protect the tip 156 from high temperatures, reduce the possibility of crack formation, and extend the life of the fuel injector 104.

As described above, the cooling gas 170 may be carbon dioxide from the carbon capture system 116. Carbon dioxide from the carbon capture system 116 may be available at quantities and temperatures suitable to serve as the cooling gas 170 during operation of the IGCC system 100. Other flame resistant gases may be used as the cooling gas 170, especially when carbon dioxide may not be available, for example, during startup situations. Examples of cooling gases 170 include, but are not limited to, non-combustible carbonaceous gases, steam, and nitrogen. Such gases do not contribute to combustion. When specific gases are used, the cooling gas conduit 172 may be referred to by the name of the cooling gas 170 selected, e.g. a nitrogen conduit, a carbonaceous gas conduit, or a carbon dioxide conduit. To provide cooling, the cooling gas 170 may be delivered between approximately 20 degrees C. and 40 degrees C. or, more specifically, at about 30 degrees C. However, any suitable coolants, coolant temperatures, and coolant flow rates may be employed to provide cooling of the fuel injector 104.

In addition to being directed to the tip 156, the cooling gas 170 may be ejected from one or more radial cooling holes 174 of the cooling gas conduit 172. The cooling gas 170 may flow out of the cooling holes 174, forming a film of cooling gas adjacent to the external surface of the cooling gas conduit 172. The film of cooling gas 170 may protect the external surface of the cooling gas conduit 172 by reducing the exposure of the external surface to high temperature recirculated combustion gas and flame holding. In addition, the flow of cooling gas 170 cools the internal surface of the cooling gas conduit 172. Thus, the possibility of damage, such as stress cracks, to the cooling gas conduit 172 is reduced because the difference between the internal and external surface temperatures of the cooling gas conduit 172 is reduced. By protecting the cooling gas conduit 172, the rest of the fuel injector 104 may be protected from damage as well. Thus, the cooling provided by the radial cooling holes 174 may reduce the possibility of damage to the fuel injector 104 and may increase the service life of the fuel injector 104.

The cooling holes 174 may be provided throughout the cooling gas conduit 172 from the upstream side 154 to the tip 156. In addition, the cooling holes 174 may be circular in shape, or configured in other shapes, such as squares, ovals, triangles, or rectangles. In some embodiments, the diameter (or width) 176 of the radial cooling holes 174 may be between approximately 0 to 20 mm, 0 to 10 mm, 1 to 5 mm, or 2 to 4 mm. Small holes such as these may enable the gas to effuse, or flow slowly, and thus, not significantly reduce the flow rate of cooling gas 170 exiting near the tip 156. Because the cooling gas 170 may effuse, the cooling holes 174 may be referred to as effusion cooling holes. In addition, the number of cooling holes 174 may be configured to enable both adequate effusion cooling and cooling of the tip 156. In certain embodiments, the fuel injector 104 may include approximately 1 to 1000, 1 to 500, 1 to 100, or 1 to 10 cooling holes 174. Furthermore, the cooling holes 174 may be disposed at an angle 178 away from the axial axis 152. The angle 178 may be between approximately 0 to 90 degrees, 0 to 60 degrees, 0 to 45 degrees, or 0 to 30 degrees. Thus, the cooling holes 174 may be configured such that the cooling gas is directed downstream toward the tip 156 of the fuel injector 104. Moreover, the angle 178 of the cooling holes 174 may decrease to approximately zero degrees moving toward the tip 156. For example, the angle 178 may gradually change by approximately 5 to 100 percent, 10 to 75 percent, or 20 to 50 percent from an upstream cooling hole 174 to a downstream cooling hole 174. This may enable more of the cooling gas to be directed toward the tip 156. Finally, the cooling gas conduit 172 and other conduits may be fabricated from materials specifically designed for high temperatures, such as, but not limited to, austenitic nickel-chromium-based superalloys.

To illustrate the structure of the conduits described above from a different perspective, FIG. 3 is a radial cross-section of the fuel injector 104 along the line labeled 3-3 in FIG. 2. Correspondingly, the axial cross-section of FIG. 2 is indicated along the line labeled 2-2 in FIG. 3. Elements in common with those shown in FIG. 2 are labeled with the same reference numerals. In the particular embodiment shown, each of the conduits 160, 164, 168, and 172 appears as an annular ring in the radial cross-section. Thus, the conduits 160, 164, 168, and 172 are coaxial or concentric with one another, thereby providing coflows of oxygen 158, fuel 162, oxygen 158, and cooling gas 170. The spacing between each conduit may be configured to adjust the flow rate of the material passing through the conduit. The illustrated radial cooling holes 174 are uniformly spaced apart circumferentially about the cooling gas conduit 172. In certain embodiments, the radial cooling holes 174 may be non-uniformly spaced apart circumferentially about the cooling gas conduit 172. In addition, the illustrated radial cooling holes 174 are oriented along radial axes extending directly from the center of the fuel injector 104. In certain embodiments, the axes of the radial cooling holes 174 may be angled and offset from the axis 152 of the fuel injector 104, thereby providing swirling flow of the cooling gas 170 about the exterior surface of the fuel injector 104.

Figure 3:
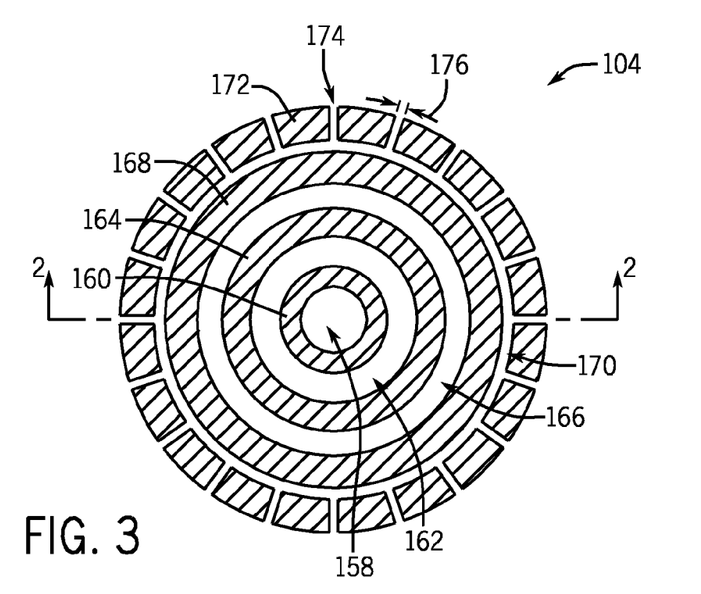
FIG. 3 is a radial cross-section of an embodiment of a fuel injector with a cooling gas conduit.

Other arrangements of flows through the fuel injector 104 other than that illustrated in FIG. 3 are possible as well. For example, the innermost conduit 160 may contain a gas fuel, conduit 164 may contain a liquid fuel, conduit 168 may contain oxygen, and conduit 172 may contain the cooling gas 170, which may be $CO_2$, nitrogen, steam, or any mixtures of these gases. In another possible arrangement, the innermost conduit 160 may contain steam, conduit 164 may contain oxygen, conduit 168 may contain fuel, and conduit 172 may contain a mixture of nitrogen and $CO_2$. In addition, the fuel injector 104 may have less than or more than four conduits. Specifically, the innermost conduit 160 may contain oxygen, conduit 164 may contain fuel, conduit 168 may be omitted, and conduit 172 may contain the cooling gas 170. Alternatively, conduit 160 may contain steam, conduit 164 may contain oxygen, conduit 168 may contain fuel, an additional conduit may contain oxygen, and conduit 172 may contain $CO_2$. Furthermore, any of the conduits 160, 164, 168, and 172 may contain mixtures. For example, the innermost conduit 160 may contain a mixture of oxygen and fuel, conduit 164 may contain oxygen, conduit 168 may be omitted, and conduit 172 may contain the cooling gas 170.

Figure 4:
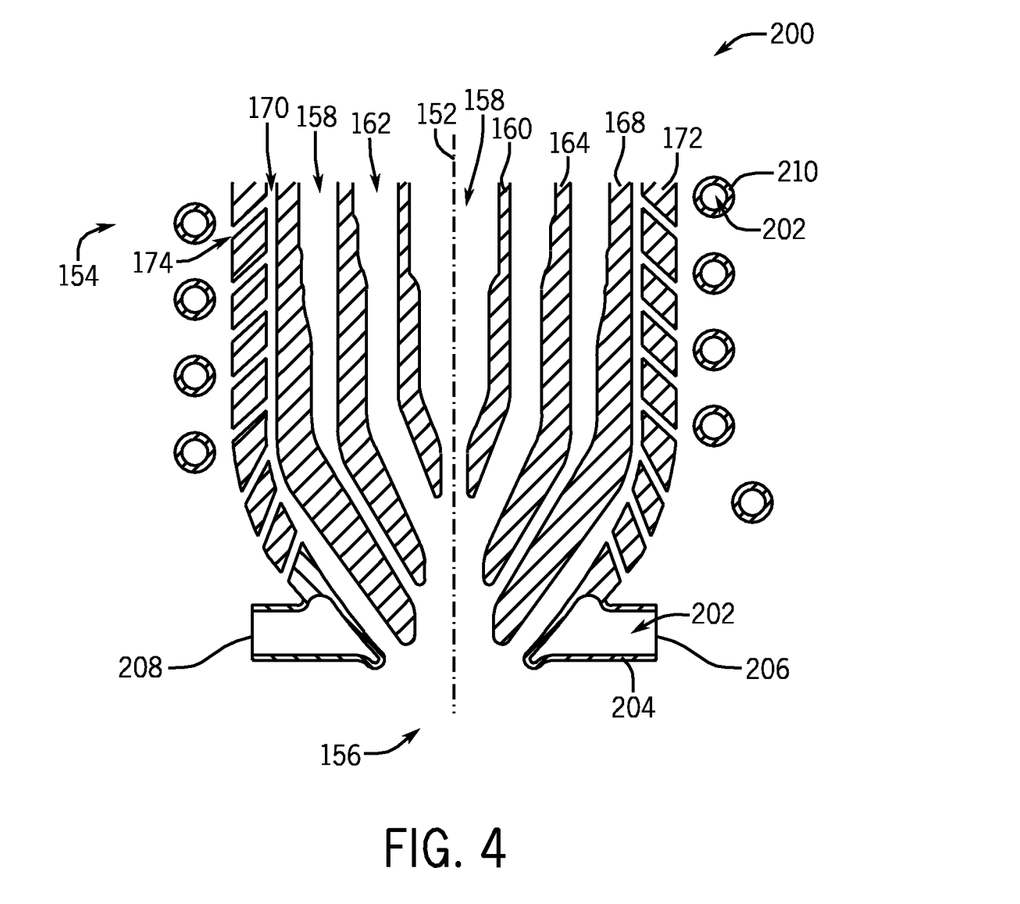
FIG. 4 is an axial cross-section of an embodiment of a fuel injector with a cooling gas conduit, a cooling liquid conduit, and a cooling coil.

Although the cooling provided by the cooling gas 170 alone may be sufficient to protect the tip 156 of the fuel injector 104, a cooling liquid conduit and cooling coil may also be added to the fuel injector 104. For example, FIG. 4 is an axial cross-section of a fuel injector 200 according to an embodiment with both gas and liquid cooling. Elements in common with those shown in FIG. 2 are labeled with the same reference numerals. In the illustrated embodiment, cooling liquid 202 circulates near the tip 156 of the fuel injector 200. Examples of the cooling liquid 202 may include, but are not limited to, water and other available coolants. The cooling liquid 202 circulates through a cooling liquid conduit 204, which is integrated with the cooling gas conduit 172. The cross-section of the cooling liquid conduit 204 may have the particular shape shown in FIG. 4, or be configured in other suitable shapes, such as squares, ovals, triangles, rectangles, or other regular or irregular shapes. In addition, the cooling liquid conduit 204 may include an entrance 206 and an exit 208 located approximately 180 degrees circumferentially apart from each other. Moreover, the cooling liquid conduit 204 and the rest of the fuel injector 200 may be fabricated from materials specifically designed for high temperatures as described above.

In the illustrated embodiment, a cooling coil 210 surrounds the fuel injector 200 to direct the cooling liquid 202 to the cooling liquid conduit 204. The cooling coil 210 may be arranged as a helical coil. For simplicity, FIG. 4 only shows the portions of the cooling coil 210 along the cross-section and not the interconnecting portions of the cooling coil 210. For example, the cooling liquid 202 may enter the cooling coil 210 near the upstream side 154 of the fuel injector 200. The cooling liquid 202 passes through the cooling coil 210 until the cooling liquid reaches the cooling liquid conduit 204. As the cooling liquid 202 passes through the cooling coil 210 and the cooling liquid conduit 204, the cooling liquid 202 may increase in temperature due to the hot combustion gases. However, this heat may be removed from the tip 156 as the warm cooling liquid 202 exits the cooling liquid conduit 204. The warm cooling liquid 202 may be passed through a heat exchanger to be cooled and circulated back to the fuel injector 200. A refrigerant or air, for example, may be used for cooling in the heat exchanger. By absorbing the heat from the hot combustion gases and carrying it away from the fuel injector 200, the cooling liquid conduit 204 helps to protect the tip 156 from high temperature damage.

Moreover, the cooling gas conduit 172 and cooling holes 174 work together with the cooling liquid conduit 202 to protect the fuel injector 200. As described above, the cooling gas conduit 172 directs cooling gas 170 over the tip 156, helping to protect the tip from flames and hot combustion gases. In addition, the cooling holes 174 create a film of cooling gas 170 over the external surface of the cooling gas conduit 172, protecting the conduit and fuel injector 200 from high temperatures through effusion cooling. Therefore, by cooling both the external and internal surfaces of the cooling liquid conduit 204, any temperature gradient may be reduced, which may reduce the possibility of damage, such as stress cracks. Furthermore, the cooling gas 170 passing through the cooling holes 174 may also protect the cooling coil 210 from high temperatures because of their close proximity. Finally, during startup situations when the cooling gas 170 may be unavailable, the circulation of the cooling liquid 202 through the cooling liquid conduit 204 may offer some protection of the tip 156 of the fuel injector 200.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a gasification fuel injector, comprising:
a fuel conduit configured to inject a fuel from a fuel outlet;
a first oxygen conduit configured to inject oxygen from a first oxygen outlet;
a second oxygen conduit configured to inject oxygen from a second oxygen outlet; and
a cooling gas conduit configured to flow a cooling gas, wherein the cooling gas is flame resistant, the cooling gas conduit comprises a plurality of radial cooling holes configured to flow the cooling gas away from an axial axis of the gasification fuel injector, the cooling gas conduit comprises a cooling gas outlet, and the cooling gas outlet is disposed axially downstream in a fuel flow direction with respect to the plurality of radial cooling holes and at least one of the fuel outlet, the first oxygen outlet, or the second oxygen outlet, or any combination thereof.

2. The system of claim 1, wherein the fuel conduit comprises a dry fuel feedstock conduit, a slurry fuel feedstock conduit, a liquid fuel feedstock conduit, or a combination thereof.

3. The system of claim 1, wherein the cooling gas conduit comprises a carbonaceous gas conduit.

4. The system of claim 3, wherein the carbonaceous gas conduit comprises a carbon dioxide ($CO_2$) conduit.

5. The system of claim 1, wherein the plurality of radial cooling holes comprise effusion cooling holes.

6. The system of claim 1, wherein the cooling gas conduit surrounds the fuel conduit, the first oxygen conduit, and the second oxygen conduit.

7. The system of claim 1, wherein the fuel conduit surrounds the first oxygen conduit, the second oxygen conduit surrounds the fuel conduit, and the cooling gas conduit surrounds the second oxygen conduit.

8. The system of claim 1, comprising a cooling liquid conduit configured to flow a cooling liquid.

9. The system of claim 1, comprising a gasifier having the gasification fuel injector.

10. The system of claim 1, wherein the plurality of radial cooling holes are configured to flow the cooling gas from a cooling gas passage surrounded by the cooling gas conduit to a combustion region surrounding the gasification fuel injector.

11. The system of claim 1, wherein a diameter of the cooling gas conduit decreases toward a tip of the gasification fuel injector.

12. The system of claim 1, wherein the plurality of radial cooling holes extends along an entire longitudinal length of the gasification fuel injector.

13. The system of claim 1, wherein the plurality of radial cooling holes are disposed at a plurality of axial positions axially upstream from the cooling gas outlet.

14. The system of claim 13, wherein the plurality of radial cooling holes progressively decrease in angle relative to the axial axis in a downstream direction toward the cooling gas outlet.

15. The system of claim 14, wherein the plurality of axial positions of the plurality of radial cooling holes comprises at least three axial positions with at least three different angles upstream from the cooling gas outlet.

16. The system of claim 1, wherein the plurality of radial cooling holes comprise a plurality of different angles relative to the axial axis.

17. The system of claim 1, wherein the cooling gas conduit comprises a converging portion extending toward a downstream end portion having the cooling gas outlet, the plurality of radial cooling holes is disposed along the converging portion upstream from the downstream end portion having the cooling gas outlet, and the plurality of radial cooling holes are angled away from the axial axis with one or more angles of less than 90 degrees.

18. The system of claim 1, wherein the fuel conduit, the first oxygen conduit, the second oxygen conduit, and the cooling gas conduit are concentric annular conduits disposed about the axial axis.

19. The system of claim 18, wherein the cooling gas conduit is an outermost annular conduit.

20. The system of claim 16, wherein the plurality of different angles of the plurality of radial cooling holes comprises at least three different angles relative to the axial axis.

21. The system of claim 16, wherein the plurality of different angles of the plurality of radial cooling holes comprises at least four different angles relative to the axial axis.

22. A system, comprising:
a gasification fuel injector, comprising:
a fuel conduit configured to inject a fuel from a fuel outlet;
a first oxygen conduit configured to inject oxygen from a first oxygen outlet;
a second oxygen conduit configured to inject oxygen from a second oxygen outlet; and
a cooling gas conduit configured to flow a cooling gas, wherein the cooling gas is flame resistant, the cooling gas conduit comprises a plurality of radial cooling holes configured to flow the cooling gas away from an axial axis of the gasification fuel injector, the cooling gas conduit comprises a cooling gas outlet, and the cooling gas outlet is disposed axially downstream in a fuel flow direction with respect to at least one of the fuel outlet, the first oxygen outlet, or the second oxygen outlet, or any combination thereof, wherein the fuel conduit surrounds the first oxygen conduit, the second oxygen conduit surrounds the fuel conduit, and the cooling gas conduit surrounds the second oxygen conduit.

23. The system of claim 22, comprising a gasifier having the gasification fuel injector.

24. A system, comprising:
a gasification fuel injector, comprising:
a fuel conduit configured to inject a fuel from a fuel outlet;
a first oxygen conduit configured to inject oxygen from a first oxygen outlet;
a second oxygen conduit configured to inject oxygen from a second oxygen outlet; and
a cooling gas conduit configured to flow a cooling gas, wherein the cooling gas is flame resistant, the cooling gas conduit comprises a plurality of radial cooling holes configured to flow the cooling gas away from an axial axis of the gasification fuel injector, the cooling gas conduit comprises a cooling gas outlet, and the cooling gas outlet is disposed axially downstream in a fuel flow direction with respect to at least one of the fuel outlet, the first oxygen outlet, or the second oxygen outlet, or any combination thereof, wherein the plurality of radial cooling holes extends along an entire longitudinal length of the gasification fuel injector.

25. The system of claim 24, comprising a gasifier having the gasification fuel injector.

* * * * *